(12) United States Patent
Palmas

(10) Patent No.: US 10,399,075 B2
(45) Date of Patent: Sep. 3, 2019

(54) FCC HIGH EFFICIENCY PARTIAL BURN REGENERATOR

(71) Applicant: UOP LLC, Des Plaines, IL (US)

(72) Inventor: Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/997,188

(22) Filed: Jun. 4, 2018

(65) Prior Publication Data

US 2018/0280964 A1 Oct. 4, 2018

Related U.S. Application Data

(63) Continuation of application No. PCT/US2016/063097, filed on Nov. 21, 2016.

(60) Provisional application No. 62/269,281, filed on Dec. 18, 2015.

(51) Int. Cl.
| | |
|---|---|
| *B01J 38/30* | (2006.01) |
| *B01J 8/28* | (2006.01) |
| *B01J 38/04* | (2006.01) |
| *B01J 8/18* | (2006.01) |
| *B01J 8/26* | (2006.01) |
| *C10G 11/18* | (2006.01) |
| *C10G 11/22* | (2006.01) |
| *F23C 10/01* | (2006.01) |
| *F23C 10/18* | (2006.01) |

(52) U.S. Cl.
CPC .............. *B01J 38/30* (2013.01); *B01J 8/1827* (2013.01); *B01J 8/26* (2013.01); *B01J 8/28* (2013.01); *B01J 38/04* (2013.01); *C10G 11/182* (2013.01); *C10G 11/22* (2013.01); *B01J 2208/00902* (2013.01); *B01J 2208/00911* (2013.01); *F23C 10/01* (2013.01); *F23C 10/18* (2013.01)

(58) Field of Classification Search
CPC ... B01J 38/34; B01J 38/14; B01J 38/20; B01J 8/1827; B01J 8/26; B01J 8/28; B01J 8/004; B01J 8/0025; C10G 11/182
See application file for complete search history.

(56) References Cited

U.S. PATENT DOCUMENTS

| | | | | |
|---|---|---|---|---|
| 4,430,201 | A * | 2/1984 | Castagnos, Jr. ....... | C10G 11/182 208/164 |
| 7,744,744 | B1 * | 6/2010 | Palmas ................. | C10G 11/182 208/113 |
| 8,173,567 | B2 * | 5/2012 | Palmas .................... | B01J 29/90 208/113 |
| 8,791,038 | B2 * | 7/2014 | Xu ........................... | B01J 29/90 502/20 |

\* cited by examiner

*Primary Examiner* — Lessanework Seifu
(74) *Attorney, Agent, or Firm* — Paschall & Maas Law Office, LLC; James C. Paschall

(57) ABSTRACT

A process for combusting coke from catalyst in partial burn mode is disclosed. The partial burn regenerator runs deprived of oxygen such that the flue gas will contain a fair amount of carbon monoxide. The oxygen present in the flue gas can burn in the bed before reaching the dilute phase. The catalyst distributor is positioned in the upper chamber of the regeneration vessel for discharging the catalyst.

19 Claims, 3 Drawing Sheets

FCC HIGH EFFICIENCY PARTIAL BURN REGENERATOR

CROSS-REFERENCE TO RELATED APPLICATIONS

This application is a Continuation of copending International Application No. PCT/US2016/063097 filed Nov. 21, 2016, which application claims priority from U.S. Provisional Application No. 62/269,281 filed Dec. 18, 2015, now expired, the contents of which cited applications are hereby incorporated by reference in their entirety.

FIELD

The field of the subject matter relates to catalyst regeneration in fluidized catalytic cracking units, and more particularly relates to a partial burn regenerator.

BACKGROUND

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke is deposited on the catalyst. A high temperature regeneration operation within a regeneration zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration or full burn produces a catalyst having less than 0.1 and preferably less than 0.05 wt % coke. In order to obtain complete regeneration, the catalyst has to be in contact with oxygen for sufficient residence time to permit thorough combustion of coke. Partial regeneration occurs when complete regeneration does not occur. Partial regeneration occurs when regeneration produces a catalyst having at least 0.1 and preferably at least 0.05 and typically at least 0.03 wt % coke.

In the regenerator, the coke is burned from the catalyst with oxygen containing gas, usually air. Flue gas formed by burning the coke in the regenerator is treated for removal of particulates and conversion of carbon monoxide, after which the flue gas may be normally discharged into the atmosphere. Conventional regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator vessel. The regenerator includes a dilute phase and a dense phase fluidized catalyst bed disposed in respective upper and lower regions of the vessel.

There are several types of catalyst regenerators in use today. A conventional bubbling bed regenerator typically has just one chamber in which air is bubbled through a dense catalyst bed. Coked catalyst is added, and regenerated catalyst is withdrawn from the same dense catalyst bed. Relatively little catalyst is entrained in the combustion gas exiting the dense bed. Two-stage bubbling beds have two chambers. Coked catalyst is added to a dense bed in an upper, first chamber and is partially regenerated with air. The partially regenerated catalyst is transported to a dense bed in a lower, second chamber and completely regenerated with air. The completely regenerated catalyst is withdrawn from the second chamber.

A combustor-style regenerator or high efficiency regenerator has a lower chamber called a combustor that burns nearly all the coke to $CO_2$ with little or no CO promoter and with low excess oxygen, typically. A portion of the hot regenerated catalyst from the upper regenerator is recirculated to the lower combustor to heat the incoming spent catalyst and to control the combustor catalyst density and temperature for optimum coke combustion rate. As the catalyst and flue gas mixture enters an upper, narrower section of the combustor, the upward velocity is further increased and the two-phase mixture exits through a disengager into an upper chamber. The upper chamber separates the catalyst from the flue gas in the disengager and cyclones and returns the catalyst to a dense catalyst bed which supplies hot regenerated catalyst to both the riser reactor and the lower combustor chamber.

Afterburn is a phenomenon that occurs when hot flue gas that has been separated from regenerated catalyst contains carbon monoxide that combusts to carbon dioxide in a dilute phase of catalyst. Insufficient catalyst is present in the dilute phase to serve as a heat sink to absorb the heat thus subjecting surrounding equipment to higher temperatures that can be over metallurgical limits and perhaps creating an atmosphere conducive to the generation of nitrous oxides that are undesirable for the environment. Incomplete combustion to carbon dioxide can result from insufficient oxygen in the combustion gas, poor fluidization or aeration of the coked catalyst in the regenerator vessel or poor distribution of coked catalyst into the regenerator vessel.

Conventionally, in a partial combustion operation, it is difficult to burn all of the carbon off the catalyst and the residual carbon can have a negative effect on catalyst activity. It is considered to be partial burn in the regenerator when either the oxygen or carbon monoxide content or both of them are present in the flue gas in a concentration of less than 0.1% and typically no greater than 200 ppm respectively at the outlet of the regenerator vessel. To avoid after burn, many refiners add carbon monoxide promoter (CO promoter) metal such as costly platinum to the FCC catalyst to promote the complete combustion to carbon dioxide before separation of the flue gas from the catalyst at the low excess oxygen required to maintain NOx at low levels. While low excess oxygen reduces NOx, the simultaneous use of CO promoter often needed for after burn control can more than offset the NOx advantage of low excess oxygen. The CO promoter decreases CO emissions but increases NOx emissions in the regenerator flue gas.

On the other hand, many refiners use high levels of CO promoter and high levels of excess oxygen to accelerate combustion and reduce afterburning in the regenerator, especially when operating at high throughputs. These practices may increase NOx by up to 10-fold from the 10-30 ppm possible when no platinum CO promoter is used and excess $O_2$ is controlled to below 0.5 vol %.

Therefore, there is a need for improved methods for preventing after burn and generation of nitrous oxides while operating a high efficiency regenerator in a partial burn mode. There is a need for a process and an apparatus to ensure thorough mixing of catalyst and combustion gas in a regenerator that can promote more uniform temperatures and catalyst activity fostering more efficient combustion of coke from catalyst.

SUMMARY

An embodiment of the invention is a process for combusting coke from catalyst comprising delivering coked catalyst to a lower chamber of a regeneration vessel. The coked catalyst is contacted with oxygen to combust coke from the coked catalyst in a partial burn mode. The catalyst and flue gas is transported from the lower chamber to an upper chamber of the regeneration vessel through a distributor into a dense catalyst bed in the upper chamber. The flue gas is separated from the regenerated catalyst in the upper chamber of the regeneration vessel. The regenerated catalyst is discharged from the upper chamber and the flue gas is discharged from the upper chamber of the regeneration vessel.

Another embodiment of the invention is a process for combusting coke from catalyst comprising contacting hydrocarbon feed with catalyst to produce cracked products and coked catalyst. The cracked products are separated from the coked catalyst. The coked catalyst is delivered to a lower chamber of a regeneration vessel. The coked catalyst is contacted with oxygen to combust coke from the coked catalyst. The catalyst and flue gas are transported from the lower to an upper chamber of the regeneration vessel through a dense catalyst bed in the upper chamber. The coked catalyst is contacted with oxygen to combust coke from the coked catalyst in the dense catalyst bed of the upper chamber. The flue gas is separated from the regenerated catalyst in the upper chamber. The regenerated catalyst is discharged from the upper chamber and the flue gas is discharged from the upper chamber of the regeneration vessel.

An embodiment of the invention is a catalyst regenerator vessel for combusting coke from catalyst comprising a lower chamber having a catalyst inlet for feeding spent catalyst to the lower chamber and a gas distributor for distributing combustion gas to the lower chamber. An upper chamber having a catalyst distributor having an inlet in the lower chamber and an outlet in the upper chamber for distributing catalyst from the lower chamber to the upper chamber and the catalyst distributor being disposed in lower third of the upper chamber. A separator in communication with the regenerator vessel is for separating flue gas from the catalyst. A flue gas outlet is for discharging flue gas from the regenerator vessel and a regenerated catalyst outlet for discharging the regenerated catalyst from the regenerator vessel.

The present subject matter provides an improved method and apparatus for preventing after burn and generation of nitrous oxides while operating high efficiency regenerator in a partial burn mode. The present subject matter provides for conversion of a high efficiency regenerator from full burn to partial burn by raising the catalyst level in the upper chamber of the regenerator vessel. The coked catalyst and flue gas from the lower chamber are discharged into the dense catalyst bed in the upper chamber. Partial burn may be effected in the upper chamber. These and other features, aspects, and advantages of the present invention will become better understood upon consideration of the following detailed description, drawings and appended claims.

DETAILED DESCRIPTION

Figure 1:
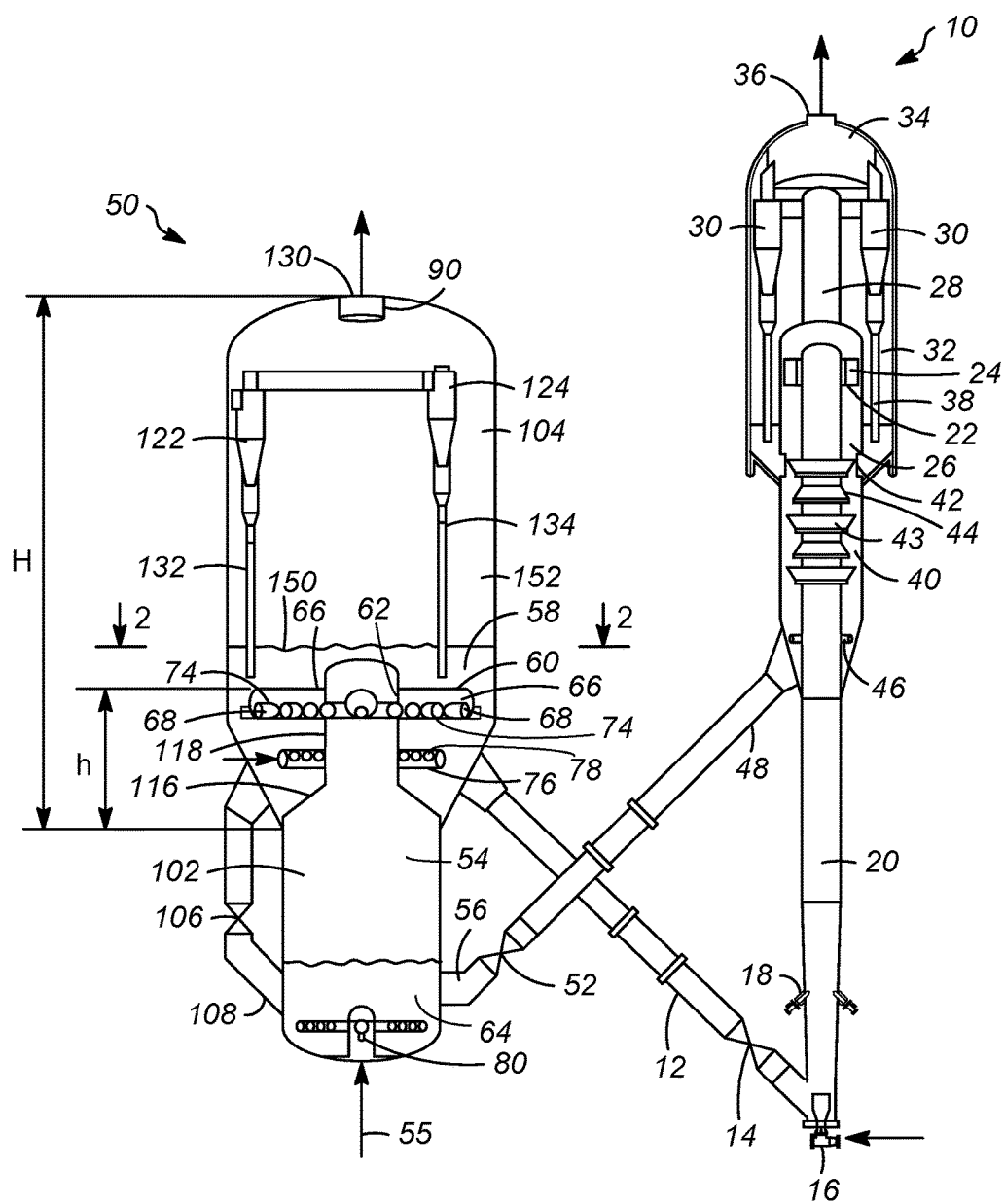
FIG. 1 is a schematic, elevational view of an FCC unit incorporating the present subject matter.

Although other uses are contemplated, the process and apparatus of the present invention may be embodied in an FCC unit. FIG. 1 shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. A fluidization medium such as steam from a nozzle 16 transports regenerated catalyst upwardly through the riser 20 at a relatively high density until a plurality of feed distributor nozzles 18 inject hydrocarbon feed across the flowing stream of catalyst particles. The catalyst contacts the hydrocarbon feed cracking it to produce smaller, cracked hydrocarbon products while depositing coke on the catalyst to produce coked catalyst.

A conventional FCC feedstock or higher boiling hydrocarbon feedstock are suitable feeds. The most common of such conventional feedstocks is a "vacuum gas oil" (VGO), which is typically a hydrocarbon material having a boiling range of from 343 to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive.

The resulting mixture continues upwardly through the riser 20 to a top at which a plurality of disengaging arms 22 tangentially and horizontally discharge the mixture of gas and catalyst from a top of the riser 20 through ports 24 into a disengaging vessel 26 that effects separation of gases from the catalyst. A transport conduit 28 carries the hydrocarbon vapors, including stripped hydrocarbons, stripping media and entrained catalyst to one or more cyclones 30 in a reactor vessel 32 which separates coked catalyst from the hydrocarbon vapor stream. The reactor vessel 32 may at least partially contain the disengaging vessel 26, and the disengaging vessel 26 is considered part of the reactor vessel 32. A collection chamber 34 in the reactor vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the reactor vessel 32, and the catalyst and adsorbed or entrained hydrocarbons pass into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The stripped, coked catalyst leaves the stripping section 40 of the reactor vessel 32 through a reactor catalyst conduit 48 and passes to the regenerator vessel 50 at a rate regulated by a control valve 52. The coked catalyst from the reactor vessel 32 usually contains carbon in an amount of from 0.2 to 2 wt %, which is present in the form of coke. Although coke is primarily composed of carbon, it may contain from 3 to 12 wt % hydrogen as well as sulfur and other materials.

The regenerator vessel 50 for combusting coke from catalyst comprises a lower chamber 102 and an upper chamber 104. The lower chamber has a catalyst inlet 56 for feeding coked catalyst to the lower chamber and a gas distributor 80. The gas distributor 80 distributes the combustion gas comprising oxygen from combustion line 55 to the lower chamber 102.

The catalyst inlet 56 delivers coked catalyst to the lower chamber 102 of the regenerator vessel 50. Oxygen-containing combustion gas, typically air, from combustion gas line 55 is delivered by the distributor 80 to the lower chamber 102 of the regenerator vessel 50. The combustion gas contacts coked catalyst in the lower chamber 102 and lifts the catalyst under fast fluidized flow conditions which form in a dilute phase 54 above a dense phase catalyst bed 64. In an embodiment, flow conditions in the lower chamber 102 will include a superficial gas velocity of 0.8 to 2.2 m/s (2.8 to 7 ft/s) and a catalyst density of from about 16 kg/m$^3$ (1 lb/ft$^3$) to about 80 kg/m$^3$ (5 lb/ft$^3$) in the dilute phase 54 and from about 320 kg/m3 (20 lb/ft3) to about 560 kg/m3 (35 lb/ft3) in the dense phase catalyst bed 64. The oxygen in the combustion gas contacts the coked catalyst and combusts carbonaceous deposits from the catalyst. Oxygen is added in proportion to combust coke from the coked catalyst in a partial burn mode to generate flue gas and partially regenerated catalyst.

The mixture of partially regenerated catalyst and flue gas flow through a frustoconical transition section 116 to the transport, riser section 118 of the lower chamber 102. The riser section defines a tube that extends upwardly from the lower chamber 102. A catalyst distributor 60 is connected to the riser section 118. The mixture of partially regenerated catalyst and gas accelerates to a higher superficial gas velocity due to the reduced cross-sectional area of the riser section 118 relative to the cross-sectional area of the lower chamber 102 below the transition section 116.

The partially regenerated catalyst and flue gas from the lower chamber 102 are transported to the upper chamber 104 of the regeneration vessel 50 through the regenerator riser section 118 to the catalyst distributor 60 with an inlet 62. The distributor 60 that has the inlet 62 that comprises an outlet for the lower chamber 102, and the distributor 60 has an outlet 68 that comprises an inlet to the upper chamber 104 for distributing partially regenerated catalyst and flue gas from the lower chamber 102 into the upper chamber 104. To maintain partial burn conditions in the lower chamber 102, the carbon monoxide concentration in the flue gas will be maintained at least about 200 ppm and preferably at least about 3 mole % and the $CO_2$ to $CO$ mole ratio will be no more than about 5 and preferably no more than about 4 and at least about 0.5 and preferably at least about 1.0 at the inlet 68 to the upper chamber 104 and the outlet 62 from the lower chamber 102 of the regenerator vessel 50. The oxygen concentration in the flue gas exiting the outlet 62 of the lower chamber is less than 0.1 mole % and preferably no greater than 200 ppm to achiever partial burn conditions in the lower chamber 102.

The partially regenerated catalyst and the flue gas entering the upper chamber 104 from the lower chamber have a large concentration of carbon monoxide due to the partial burn operation in the lower chamber 102. To avoid the after burn phenomenon in the upper chamber 104, the flue gas and partially regenerated catalyst are discharged into a dense catalyst bed 58. Oxygen is added to the upper chamber 104 into the dense catalyst bed 58 from a combustion gas distributor 76. The oxygen oxidizes the carbon monoxide to carbon dioxide to generate heat, but sufficient catalyst is present in the dense catalyst bed 58 to absorb the heat of combustion, thus protecting the equipment from heat damage.

The catalyst distributor 60 preferably comprises at least one and preferably a plurality of nozzles 74 that provide outlets 68 communicating with the header 66 for discharging partially regenerated catalyst into the upper chamber 104 of the regenerator vessel 50. The top of the outlet of the catalyst distributor 60 is disposed in a lower third of the upper chamber 104, so the catalyst distributor 60 will be submerged in the catalyst bed 58. FIG. 1 shows the total height from lower end of the upper chamber 104 to the upper end of the upper chamber as H and the position of the catalyst distributor 60 in a lower third of the upper chamber 104 as h which is no greater than H divided by 3 (H/3). Specifically, the top of the highest outlet 68 has a height h that is no greater than H/3. In FIG. 1, all of the outlets 68 have the same height. The partially regenerated catalyst is transported from the regenerator riser 118 through the distributor 60 into a dense catalyst bed 58 in the upper chamber 104. In operation, the catalyst distributor 60 is preferably submerged in the catalyst bed 58 below a top surface 150 thereof. Additionally, the catalyst distributor 60 radially discharges partially regenerated catalyst into the dense catalyst bed 58 from under the top surface 150 of the dense catalyst bed 58. The partially regenerated catalyst may discharge horizontally from the distributor. The flue gas in the regenerator riser 118 exiting from the lower chamber 102 assists in the discharge of the partially regenerated catalyst into the bed 58 from the catalyst distributor 60 and may also provide leftover oxygen for combustion requirements in the upper chamber 104.

Oxygen containing combustion gas, perhaps air, is delivered to the combustion gas distributor 76 in the upper chamber 104 for distribution through outlets 78 to the upper chamber 104 of the regenerator vessel 50. The oxygen in the combustion gas distributed to the upper chamber 104 burns remaining coke from partially regenerated catalyst in the dense phase catalyst bed 58 before ascending through the top surface 150 of the bed 58 into the dilute phase 152. The top of the outlet of the combustion gas distributor 76 is disposed in a lower third of the upper chamber 104, so the combustion gas distributor 76 will be submerged in the catalyst bed 58. FIG. 1 shows the position of the combustion gas distributor 76 in a lower third of the upper chamber 104 below h which is no greater than H divided by 3 (H/3). Specifically, the top of the highest outlet 78 has a height h that is no greater than H/3.

Catalyst may get entrained with flue gas ascending in the dilute phase 152 in the upper chamber 104 of the regenerator vessel 50. The catalyst entrained in the flue gas will therefore enter cyclone separators 122, 124 which centripetally separate flue gas from heavier catalyst particles. The flue gas is separated from the regenerated catalyst in the upper chamber 104. Catalyst particles will fall down diplegs 132, 134 and enter dense phase catalyst bed 58 again. The diplegs may be submerged in the catalyst bed 58 below the top surface 150. Completely regenerated catalyst from the dense catalyst bed 58 is discharged from the upper chamber 104 and transferred to the regenerated catalyst conduit 12. Completely regenerated catalyst regulated by control valve 14 descends the reactor catalyst conduit 12 from the upper chamber 104 back to the reactor section 10 and enters the riser 20 where it again contacts feed as the FCC process continues.

In an embodiment, to accelerate combustion of the coke in the lower chamber 102, hot fully regenerated catalyst from a dense catalyst bed 58 in the upper chamber 104 may be recirculated into the lower chamber 102 via an external recycle catalyst conduit 108 regulated by a control valve 106. Hot fully regenerated catalyst enters an inlet of recycle catalyst conduit 108 which is connected to and in downstream communication with the upper chamber 104. Recirculation of regenerated catalyst, by mixing hot catalyst from the dense catalyst bed 58 with relatively cool, coked catalyst from the reactor catalyst conduit 48 entering the lower chamber 102, raises the overall temperature of the catalyst and gas mixture in the lower chamber 102.

The regenerator vessel 50 is operated under partial burn conditions in the lower chamber 102 and the upper chamber 104. Approximately no more than 10-30 wt % of the total gas requirements within the process enters the dense catalyst bed 58 in the upper chamber 104 with the remainder 70-90 wt % being added to the lower chamber 102. In this embodiment, combustion gas may be added to the upper chamber 104 for both combustion and fluidization purposes. If air is the combustion gas, typically 10 to 12 kg (lbs) of air are required per kilogram (pound) of coke fed on catalyst to the regenerator vessel for partial burn. The regenerator vessel 50 typically has a temperature of about 594 to about 704° C. (1100 to 1300° F.) in the lower chamber 102 and about 649 to about 760° C. (1200 to 1400° F.) in the upper chamber 104. Pressure may be between 173 and 414 kPa (gauge) (25 to 60 psig) in both chambers.

The superficial velocity of the combustion gas in the upper chamber 104 is typically between about 0.8 m/s (2.7 ft/s) and about 1.2 m/s (4.0 ft/s) and the density of the dense bed 58 is typically between about 400 kg/m3 (25 lb/ft3) and about 640 kg/m3 (40 lb/ft3) and the density of the dilute phase 152 is typically between about 4.8 kg/m3 (0.3 lb/ft3) and about 32 kg/m3 (2 lb/ft3) depending on the characteristics of the catalyst.

Flue gas with a lighter loading of catalyst will ascend from the cyclone separators 122, 124 through ducts into plenum 90 and discharge from the upper chamber 104 through a flue gas outlet 130. The carbon monoxide content in the flue gas is maintained at least about 200 ppm and preferably at least about 3 mole % at the flue gas outlet 130 of the upper chamber 104 of the regenerator vessel and the $CO_2$ to CO mole ratio in the flue gas outlet 130 will be at least about 0.5 and preferably at least about 1 and no more than about 5 and preferably no more than about 4 to achieve partial burn combustion of coke. The oxygen concentration in the flue gas exiting the outlet 130 of the upper chamber 104 is less than 0.1 mole % and preferably no greater than 200 ppm to achiever partial burn conditions in the upper chamber. Although partial burn conditions will be maintained in the upper chamber 104, the partially regenerated catalyst from the lower chamber 102 will encounter sufficient oxygen to be completely regenerated in the upper chamber 104.

Figure 2:
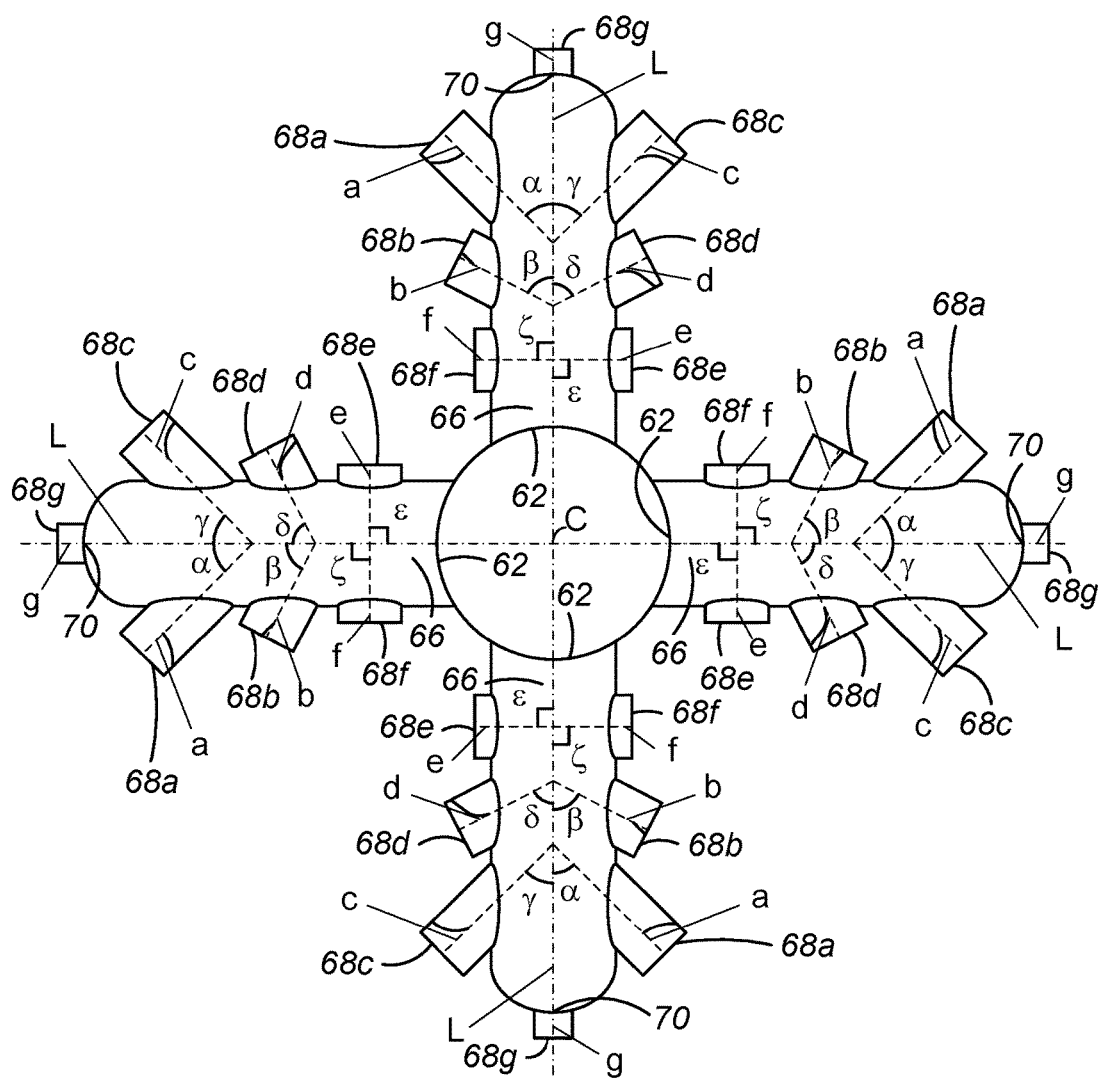
FIG. 2 is a sectional view of the regenerator vessel of FIG. 1 taken at segment 2-2.

A plan view of the catalyst distributor 60 taken at segment 2-2 of FIG. 1 omitting the dip legs 132, 134 is shown in FIG. 2. The catalyst distributor may comprise a header 66 or a plurality of headers 66. Four headers are exemplarily shown in FIG. 2. The flue gas with partially regenerated catalyst from lower chamber 102 is transported to the distributor 60 in the upper chamber 104 through a plurality of headers 66. Each header 66 defines a longitudinal axis L and an angular nozzle 68a in downstream communication with the header 66 that discharges the catalyst at an acute angle to the longitudinal axis. The catalyst is discharged from the distributor 60 through nozzles 68 with a bottom disposed in the lower quarter of the header 66. The angular nozzle 68a defines an acute angle α with the longitudinal axis L of the header 66. In other words, a longitudinal axis a defined by the angular nozzle 68a defines an acute angle α with the longitudinal axis L. The angular nozzle is in communication with the header 66. There may be two angular nozzles defining two different angles with the longitudinal axis. The angular nozzle 68a discharges catalyst into the upper chamber 104 of the regenerator vessel 50 at an acute angle α to the longitudinal axis L. The bottom of the nozzle 68a is disposed in the bottom quarter of the header 66. In an embodiment, pluralities of nozzles 68a-d in downstream communication with and connected to the header 66 each have an axis that defines an acute angle with longitudinal axis L. The nozzles 68b-d define acute angles β, γ and δ with the longitudinal axis L of the header 66, respectively. In other words, longitudinal axes a-d defined by the nozzles 68a-d define acute angles with the longitudinal axis L, respectively. The plurality of nozzles 68a-d discharge partially regenerated catalyst into the regenerator vessel 50 at acute angles to the longitudinal axis L. A proximate nozzle 68e may be perpendicular to the longitudinal axis L. Similarly, a proximate nozzle 68f may be perpendicular to the longitudinal axis L. In other words, longitudinal axes e and f defined by the nozzles 68e and f each define right angles ε, ζ with the longitudinal axis L. Nozzles 68a, b and f are one side of the header 66 and nozzles c, d and e are on the opposite side of the header 66. Nozzles directly opposed to each other may have the same length and define the same angle with the longitudinal axis L. In an embodiment, angular nozzles on the same side of the header 66 define angles α and β and γ and δ with longitudinal axis L that are each different. The catalyst distributor may include a distal nozzle 68g on the outer end 70 of the header 66 that defines a longitudinal axis g that is aligned with the longitudinal axis L.

In an embodiment, the smallest angles the nozzles 68a-g define with the longitudinal axis L successively decrease as the nozzles are positioned further away from the inlet 62 and closer to the outer end 70. The nozzles discharge catalyst at angles to the longitudinal axis L at angles that successively decrease as the distance from the inlet end increases. This allows the nozzles to radially project catalyst in equal portions across the cross section of the bed to which the header 66 is dedicated in the upper chamber 104 of the regenerator vessel 50. Additionally, in an embodiment, the length of the nozzles 68a-f on both sides of the header 66 successively increase as the nozzles are positioned further away from the inlet 62 and closer to the outer end 70. The catalyst distributor 60 may comprise four headers 66 with each header disposed in one quadrant of the cross section of the upper chamber of the regenerator vessel 50. Moreover, the longitudinal axis L may intersect a sectional center C of the regenerator vessel 50. The aligned distal nozzles 68g are also shown in FIG. 2. Distal nozzles 68g also each have an axis g which is horizontally aligned with axis L.

Figure 3:
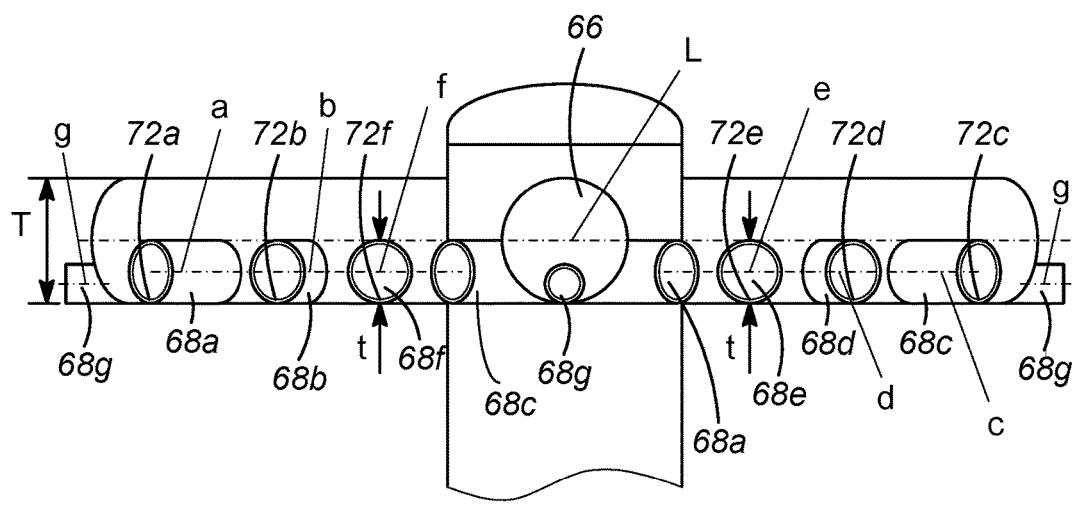
FIG. 3 is an enlarged partial elevational view of the catalyst distributor of the present subject matter.

FIG. 3 provides an enlarged, partial elevational view of the catalyst distributor 60 with the headers 66 defining a height T. A bottom 72a of the nozzle 68a is disposed in the bottom quarter of the height T of the header 66. In an embodiment, the bottom 72a is defined as the lowest point of the inner circumference of the nozzle 68a. The positioning of the nozzle 68a with respect to the header 66 assures no catalyst stagnates in the header 66. The nozzle 68a also has a height t. In an embodiment, over 50% of the height t of the nozzle 68a is disposed below 50% of a height T of the header 66. FIG. 3 also illustrates that longitudinal axis a defined by the nozzle 68a is horizontal in an embodiment. In an embodiment, the longitudinal axis L of the header 66 is also horizontal. In a further embodiment, bottoms 72a-f of all the nozzles 68a-f are disposed in the bottom quarter of the height T of the header 66. In an embodiment, the bottoms 72a-f is defined as the lowest point of the inner circumference of the nozzle 68a-f. In an embodiment, all the nozzles 68a-f have heights t and over 50% of a height t of the nozzles 68a-f are disposed below 50% of a height T of the header 66. In an additional embodiment, the longitudinal axes defined by all the nozzles 68a-f are horizontal. The aligned distal nozzles 68g are also shown in FIG. 3. Distal nozzles 68g also each have an axis g which is horizontal and parallel with axis L. The horizontal nozzles 68a-g discharge catalyst horizontally from header 66.

The catalyst distributor 60, will typically be made of stainless steel such as 304 stainless steel, and coated with abrasion resistant lining both externally and internally. The regenerator may be equipped with one or more catalyst coolers to avoid excessively hot regenerator temperatures.

While the subject matter has been described with what are presently considered the preferred embodiments, it is to be understood that the subject matter is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is a process for combusting coke from catalyst comprising delivering coked catalyst to a lower chamber; contacting coked catalyst with oxygen to combust coke from the coked catalyst in a partial burn mode; transporting catalyst and flue gas from the lower chamber to an upper chamber through a distributor into a dense catalyst bed in the upper chamber; separating flue gas from regenerated catalyst in the upper chamber; discharging regenerated catalyst from said upper chamber; and discharging flue gas from said upper chamber. An embodiment of the invention is one, any or all of prior embodiments in this paragraph up through the first embodiment in this paragraph wherein said distributor has a header defining a longitudinal axis and discharging said catalyst at an acute angle to said longitudinal axis. An embodiment of the invention is one, any or all of prior embodiments in this paragraph up through the first embodiment in this paragraph further including discharging catalyst from said distributor through nozzles with a bottom disposed in the lower quarter of said header. An embodiment of the invention is one, any or all of prior embodiments in this paragraph up through the first embodiment in this paragraph wherein said distributor discharges catalyst from under a top surface of the dense catalyst bed. An embodiment of the invention is one, any or all of prior embodiments in this paragraph up through the first embodiment in this paragraph wherein said distributor is disposed in lower third of the upper chamber. An embodiment of the invention is one, any or all of prior embodiments in this paragraph up through the first embodiment in this paragraph further comprising discharging catalyst from said distributor horizontally. An embodiment of the invention is one, any or all of prior embodiments in this paragraph up through the first embodiment in this paragraph wherein said catalyst distributor has an inlet end and discharges catalyst at angles to said longitudinal axis, said angles successively decrease as the distance from the inlet end increases. An embodiment of the invention is one, any or all of prior embodiments in this paragraph up through the first embodiment in this paragraph further comprising transporting flue gas with catalyst from the lower chamber to the upper chamber through a plurality of headers each defining longitudinal axis. An embodiment of the invention is one, any or all of prior embodiments in this paragraph up through the first embodiment in this paragraph further comprising transporting the catalyst and flue gas upwardly from the lower chamber to the distributor.

A second embodiment of the invention is a process for combusting coke from catalyst comprising contacting hydrocarbon feed with catalyst to produce cracked products and coked catalyst; separating said cracked products from said coked catalyst; delivering said coked catalyst to a lower chamber of a regeneration vessel; contacting coked catalyst with oxygen to combust coke from the coked catalyst; transporting catalyst and flue gas from the lower chamber to an upper chamber of the regeneration vessel through a distributor into a dense catalyst bed in the upper chamber; contacting coked catalyst with oxygen to combust coke from the coked catalyst in the dense catalyst bed of the upper chamber; separating flue gas from regenerated catalyst in the upper chamber; discharging regenerated catalyst from said upper chamber; and discharging flue gas from said upper chamber. An embodiment of the invention is one, any or all of prior embodiments in this paragraph up through the second embodiment in this paragraph further including discharging catalyst from said catalyst distributor horizontally. An embodiment of the invention is one, any or all of prior embodiments in this paragraph up through the second embodiment in this paragraph further comprising discharging the catalyst from the said distributor into the upper chamber at an acute angle to a longitudinal axis and wherein the catalyst distributor includes a header defining the longitudinal axis. An embodiment of the invention is one, any or all of prior embodiments in this paragraph up through the second embodiment in this paragraph further comprising transporting the catalyst and flue gas upwardly from the lower chamber to the distributor and wherein the distributor is disposed in lower third of the upper chamber.

A third embodiment of the invention is an apparatus for a catalyst regenerator vessel for combusting coke from catalyst comprising a lower chamber having a catalyst inlet for feeding spent catalyst to said lower chamber and a gas distributor for distributing combustion gas to said lower chamber; an upper chamber having a catalyst distributor having an inlet in the lower chamber and an outlet in the upper chamber for distributing catalyst from said lower chamber to said upper chamber, said catalyst distributor being disposed in lower third of the upper chamber; a separator in communication with said regenerator vessel for separating flue gas from said catalyst; a flue gas outlet for discharging flue gas from said vessel; and a regenerated catalyst outlet for discharging regenerated catalyst from said vessel. An embodiment of the invention is one, any or all of prior embodiments in this paragraph up through the third embodiment in this paragraph wherein the catalyst distributor comprises a header having a longitudinal axis and an angular nozzle in communication with said header, said angular nozzle defining an acute angle with said longitudinal axis for discharging catalyst into said upper chamber. An embodiment of the invention is one, any or all of prior embodiments in this paragraph up through the third embodiment in this paragraph wherein a bottom of said nozzle is disposed in the bottom quarter of said header. An embodiment of the invention is one, any or all of prior embodiments in this paragraph up through the third embodiment in this paragraph wherein a longitudinal axis through said nozzle is horizontal. An embodiment of the invention is one, any or all of prior embodiments in this paragraph up through the third embodiment in this paragraph including two angular nozzle defining two different angles with said longitudinal axis. An embodiment of the invention is one, any or all of prior embodiments in this paragraph up through the third embodiment in this paragraph including a plurality of nozzles and said angular nozzle, said header having an entrance and an outer end, said nozzles defining smallest angles with said longitudinal axis that successively decrease as the nozzles are positioned further away from entrance and closer to said outer end. An embodiment of the invention is one, any or all of prior embodiments in this paragraph up through the third embodiment in this paragraph further comprising a riser in the lower chamber having a decreased cross-sectional area, said catalyst distributor being connected to said riser.

Without further elaboration, it is believed that using the preceding description that one skilled in the art can utilize the present invention to its fullest extent and easily ascertain the essential characteristics of this invention, without departing from the spirit and scope thereof to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A process for combusting coke from catalyst comprising:
   delivering coked catalyst to a lower chamber of a regeneration vessel;
   contacting coked catalyst with oxygen to combust coke from the coked catalyst in a partial burn mode;
   transporting catalyst and flue gas from the lower chamber to an upper chamber of the regeneration vessel through a first distributor into a dense catalyst bed in the upper chamber, wherein said first distributor discharges the catalyst from under a top surface of the dense catalyst bed in the upper chamber;
   supplying oxygen to the dense catalyst bed through a second distributor positioned below said first distributor;
   separating flue gas from regenerated catalyst in the upper chamber;
   discharging regenerated catalyst from said upper chamber; and
   discharging flue gas from said upper chamber.

2. The process of claim 1 wherein said first distributor has a header defining a longitudinal axis and discharging said catalyst at an acute angle to said longitudinal axis.

3. The process of claim 1 further including discharging catalyst from said first distributor through nozzles with a bottom disposed in the lower quarter of said header.

4. The process of claim 1 wherein said first distributor is disposed in lower third of the upper chamber.

5. The process of claim 1 further comprising discharging catalyst from said first distributor horizontally.

6. The process of claim 2 wherein said first distributor has an inlet end and discharges catalyst at angles to said longitudinal axis, said angles successively decrease as the distance from the inlet end increases.

7. The process of claim 1 further comprising transporting flue gas with catalyst from the lower chamber to the upper chamber through a plurality of headers each defining longitudinal axis.

8. The process of claim 7 further comprising transporting the catalyst and flue gas upwardly from the lower chamber to said first distributor.

9. A process for combusting coke from catalyst comprising:
   contacting hydrocarbon feed with catalyst to produce cracked products and coked catalyst;
   separating said cracked products from said coked catalyst;
   delivering said coked catalyst to a lower chamber of a regeneration vessel;
   contacting coked catalyst with oxygen to combust coke from the coked catalyst;
   transporting catalyst and flue gas from the lower to an upper chamber of the regeneration vessel through a first distributor into a dense catalyst bed in the upper chamber, wherein said first distributor discharges the catalyst from under a top surface of the dense catalyst bed in the upper chamber;
   contacting coked catalyst with oxygen discharged from a second distributor to combust coke from the coked catalyst in the dense catalyst bed of the upper chamber, said second distributor being positioned below said first distributor;
   separating flue gas from regenerated catalyst in the upper chamber;
   discharging regenerated catalyst from said upper chamber; and
   discharging flue gas from said upper chamber.

10. The process of claim 9 further including discharging catalyst from said first distributor horizontally.

11. The process of claim 9 further comprising discharging the catalyst from the said first distributor into the upper chamber at an acute angle to a longitudinal axis and wherein said first distributor includes a header defining the longitudinal axis.

12. The process of claim 9 further comprising transporting the catalyst and flue gas upwardly from the lower chamber to said first distributor and wherein said first distributor is disposed in lower third of the upper chamber.

13. A catalyst regenerator vessel for combusting coke from catalyst comprising:
   a lower chamber having a catalyst inlet for feeding spent catalyst to said lower chamber and a gas distributor for distributing combustion gas to said lower chamber;
   an upper chamber having a catalyst distributor having an inlet in the lower chamber and an outlet in the upper chamber for distributing catalyst from said lower chamber to said upper chamber, said catalyst distributor being disposed in lower third of the upper chamber, wherein said distributor discharges catalyst from under a top surface of a dense catalyst bed in the upper chamber;

a combustion gas distributor positioned below said catalyst distributor and configured to supply oxygen to the dense catalyst bed;

a separator in communication with said regenerator vessel for separating flue gas from said catalyst;

a flue gas outlet for discharging flue gas from said vessel; and a regenerated catalyst outlet for discharging regenerated catalyst from said vessel.

14. The catalyst regenerator vessel of claim 13 wherein the catalyst distributor comprises a header having a longitudinal axis and an angular nozzle in communication with said header, said angular nozzle defining an acute angle with said longitudinal axis for discharging catalyst into said upper chamber.

15. The catalyst regenerator vessel of claim 14 wherein a bottom of said nozzle is disposed in the bottom quarter of said header.

16. The catalyst regenerator vessel of claim 14 wherein a longitudinal axis through said nozzle is horizontal.

17. The catalyst regenerator vessel of claim 14 including two angular nozzles defining two different angles with said longitudinal axis.

18. The catalyst regenerator vessel of claim 14 including a plurality of nozzles and said angular nozzle, said header having an entrance and an outer end, said nozzles defining smallest angles with said longitudinal axis that successively decrease as the nozzles are positioned further away from entrance and closer to said outer end.

19. The catalyst regenerator vessel of claim 13 further comprising a riser in the lower chamber having a decreased cross-sectional area, said catalyst distributor being connected to said riser.

* * * * *